(12) United States Patent
Sugiyama et al.

(10) Patent No.: US 9,488,211 B2
(45) Date of Patent: Nov. 8, 2016

(54) FASTENED STRUCTURE

(71) Applicant: CANON KABUSHIKI KAISHA, Tokyo (JP)

(72) Inventors: Tadahisa Sugiyama, Matsudo (JP); Tsuyoshi Nagasaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/923,635

(22) Filed: Jun. 21, 2013

(65) Prior Publication Data
US 2014/0003879 A1   Jan. 2, 2014

(30) Foreign Application Priority Data

Jun. 29, 2012   (JP) ................................. 2012-146867

(51) Int. Cl.
| F16B 5/02 | (2006.01) |
| F16B 33/00 | (2006.01) |
| F16B 37/02 | (2006.01) |
| F16B 31/02 | (2006.01) |

(52) U.S. Cl.
CPC .............. F16B 33/00 (2013.01); F16B 5/02 (2013.01); F16B 37/02 (2013.01); *F16B 5/0258* (2013.01); *F16B 31/02* (2013.01)

(58) Field of Classification Search
CPC ................................ F16B 39/282; F16B 5/02
USPC ................... 411/166, 160–165; 403/408.1
See application file for complete search history.

(56) References Cited

U.S. PATENT DOCUMENTS

| 2,052,063 | A | * | 8/1936 | Wenn | 411/531 |
| 3,141,532 | A | * | 7/1964 | Runyan | 52/105 |
| 3,316,605 | A | * | 5/1967 | Tabbert | 24/277 |
| 4,310,272 | A | * | 1/1982 | Rich et al. | 411/185 |
| 4,518,294 | A | * | 5/1985 | Barth | 411/188 |
| 4,659,246 | A |   | 4/1987 | Sugiyama | |
| 4,749,322 | A | * | 6/1988 | Sygnator | 411/387.3 |
| 4,812,095 | A | * | 3/1989 | Piacenti et al. | 411/188 |
| 5,827,028 | A | * | 10/1998 | Swick | 411/368 |

(Continued)

FOREIGN PATENT DOCUMENTS

| CN | 201475100 U | 5/2010 |
| CN | 20122266375 U | 6/2012 |

(Continued)

OTHER PUBLICATIONS

Nov. 25, 2013 Great Britain Search Report in Great Britain Patent Application No. GB1311669.4.

(Continued)

*Primary Examiner* — Flemming Saether
(74) *Attorney, Agent, or Firm* — Fitzpatrick, Cella, Harper & Scinto (57) ABSTRACT a fastened structure comprising: a first member provided with a female screw; a second member provided with an opening; and a male screw fastening the first member and the second member with each other and including a male screw portion, and a head portion having a bearing surface, wherein the male screw portion is threaded in the female screw through the opening of the second member, wherein the second member is provided with a substantially circular folded portion including a curved surface defining the opening and including a free end having an edge pressed against the bearing surface of the male screw.

7 Claims, 5 Drawing Sheets

(56) References Cited

U.S. PATENT DOCUMENTS

| | | |
|---|---|---|
| 7,757,367 B2 | 7/2010 | Makimae et al. |
| 8,375,549 B2 | 2/2013 | Draht et al. |
| 8,545,157 B2 | 10/2013 | Golovashchenko |
| 2003/0143056 A1* | 7/2003 | Miura .................. 411/386 |
| 2012/0315109 A1 | 12/2012 | Golovashchenko |
| 2013/0008009 A1 | 1/2013 | Draht et al. |
| 2014/0271030 A1* | 9/2014 | Yamaguchi ............ 411/313 |

FOREIGN PATENT DOCUMENTS

| | | |
|---|---|---|
| CN | 202746914 U | 2/2013 |
| DE | 3246180 C1 | 6/1984 |
| JP | S53-163470 U | 12/1978 |
| JP | 02-251325 A | 10/1990 |
| JP | 05-50136 A | 3/1993 |
| JP | H05-071524 A | 3/1993 |
| JP | H07-091428 A | 4/1995 |
| JP | H07-286438 A | 10/1995 |
| JP | 2003-222109 A | 8/2003 |
| JP | 2005-240950 A | 9/2005 |
| JP | 2005-331091 A | 12/2005 |
| JP | 2006-177438 A | 7/2006 |
| JP | 2007-016962 A | 1/2007 |
| JP | 2007-182923 A | 7/2007 |
| RU | 2 433 317 C2 | 11/2011 |

OTHER PUBLICATIONS

Nov. 14, 2014 Russian Office Action in Russian Patent Application No. 2013127684/12 (041297).
Feb. 4, 2015 2014 Chinese Office Action in Chinese Patent Application No. 201310264533.6 (with English translation).
Office Action issued in counterpart Japanese Patent Application No. 2012-146867, dated Mar. 15, 2016.
Search Report issued in counterpart United Kingdom Patent Application No. GB1516682.0, dated Jun. 8, 2016.
Russian Notice of Allowance, dated Jan. 11, 2016, in corresponding Russian Application No. 2013127684/12.
Office Action dated Oct. 30, 2015, in corresponding Korean Patent Application No. 10-2013-0075153.

* cited by examiner

FASTENED STRUCTURE

FIELD OF THE INVENTION AND RELATED ART

The present invention relates to a fastened structure using a thin metal plate in a mechanical apparatus such as an image forming apparatus which is, e.g., a printer, a facsimile machine, a copying machine or a multi-function machine having functions of these machines in combination.

In a recent mechanical apparatus such as the image forming apparatus (e.g., the printer, the copying machine or the like), an energy-saving effect by reduction in weight is expected, and it is required that a thickness of the metal plate constituting the apparatus is made small. Further, to maintain the strength of a casing of the apparatus and to suppress emission of electromagnetic noise to the inside and periphery of the apparatus by establishing a stable electrical frame ground connection, a predetermined fastening force is required between a contact portion of the burr of the metal plate, constituting the apparatus, and a member to be fastened to the metal plate. That is, the fastening metal plate (hereinafter referred to as a "fastening material"), and the member to the fastened to the female (this member is hereinafter referred to as a "fastened material") are connected with each other at a contact portion (hereinafter referred to as a "fastening portion") for connecting the fastening material and the fastened material. At the fastening portion, the predetermined fastening force is required. Also in the case where the fastening material and the fastened material are fastened to each other by a screw, there is a need to fasten the screw at a predetermined fastening torque. At that time, a breakdown torque capable of withstanding the fastening torque is required at the fastening portion.

In a conventional case where the fastening material has a plate thickness to some extent, the material is drawn by burring, so that a drawn height (hereinafter referred to as a "burring height") can be ensured. As a result, the drawn height portion contacts a thread engaging portion of the screw, and therefore it is possible to obtain a sufficient thread engaging length, so that a necessary breakdown torque can be ensured.

However, in the case where the plate thickness of the fastening material is small, even when the material is drawn by the burring, a total thread engaging length becomes short, correspondingly to the small plate thickness. By the fastening with the screw, an axial force is generated at the burring portion, but when the thread engaging length portion on which the axial force is exerted becomes short, a screw thread is liable to be deformed. Further, a peripheral portion of the burring portion cannot withstand impact by the fastening with the screw and thus is also liable to be deformed.

In order to solve these problems, Japanese Laid-Open Patent Application (JP-A) 2006-177438 proposes a means for fastening a fastening material by providing a rubber-mode elastic member between a fastened material and a screw head of a screw and then by exerting a fastening torque on the screw while compressing the elastic member. In this means, by fastening the fastening material with the screw by applying a fastening torque to the female 2, the elastic member is compressed. As a result, normal reaction by a repelling force of the elastic member and a frictional force between the elastic member and the screw head by an anti-loosening resistance of the elastic member are increased. A fastening force of the screw is improved by a burring effect on the basis of the normal reaction by the repelling force of the elastic member, and by the frictional force between the elastic member and the screw head by the anti-loosening resistance of the elastic member.

In general, the fastening torque of the screw is divided into a bearing surface torque between the screw head and the fastened material and a thread portion torque generated by engagement of a screw thread portion with a female screw portion, of the fastened material, corresponding to the burring portion of the fastening material. In the means proposed in JP-A 2006-177438, the bearing surface torque is increased by increasing the frictional force between the screw head and the elastic member, and a breakdown torque at the fastening portion is increased by the burring effect by the fastening with the screw by disposing the elastic member.

However, as in the means proposed by JP-A 2006-177438, in a means in which the elastic member separately from the fastening material and the fastened material is needed, there is a possibility that the elastic member is forgotten to be assembled during assembling. Further, the use of the elastic member leads to an increase in cost due to an increase in the number of parts.

Further, in the conventional structure, in a position where there is a need to establish electrical connection between the fastening material and the fastened material, the fastening material and the fastened material are fastened with the screw, so that direct electrical connection is established at the contact portion between the fastening material and the fastened material. That is, the fastening material and the fastened material are electrically connected via the contact portion between the fastened material and the screw head and the contact of the screw thread portion with the thread engaging portion of the fastening material. However, in the means proposed by JP-A 2006-177438, a non-electroconductive rubber is used between the screw and the fastened material, so that electroconductivity at the fastening portion cannot be expected. Further, even when the elastic member is changed from the non-electroconductive rubber as the means proposed by JP-A 2006-177438 to an electroconductive rubber, the electroconductivity is inferior to that ensured by contact between metal members.

SUMMARY OF THE INVENTION

A principal object of the present invention is to provide a fastened structure, for a thin metal plate, capable of fastening a fastening material (first member) and a fastened material (second member) at a predetermined fastening torque, without increasing the number of parts while maintaining operation productivity during screw fastening, even in the case of a fastening portion where stable electrical connection between the fastening material and the fastened material is required.

According to an aspect of the present invention, there is provided a fastened structure comprising: a first member provided with a female screw; a second member provided with an opening; and a male screw fastening the first member and the second member with each other and including a male screw portion, and a head portion having a bearing surface, wherein the male screw portion is threaded in the female screw through the opening of the second member, wherein the second member is provided with a substantially circular folded portion including a curved surface defining the opening and including a free end having an edge pressed against the bearing surface of the male screw.

According to another aspect of the present invention, there is provided a fastened structure comprising: a first member provided with a female screw; a second member provided with an opening; and a male screw fastening the first member and the second member with each other and including a male screw portion, and a head portion having a bearing surface, wherein the male screw portion is threaded in the female screw through the opening of the second member, wherein the second member is provided with a substantially circular folded portion including a curved surface defining the opening and including a free end having an edge biting into the bearing surface of the male screw.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the fastened structure according to the present invention will be described specifically with reference to the drawings.

(Embodiment 1)

Figure 1:
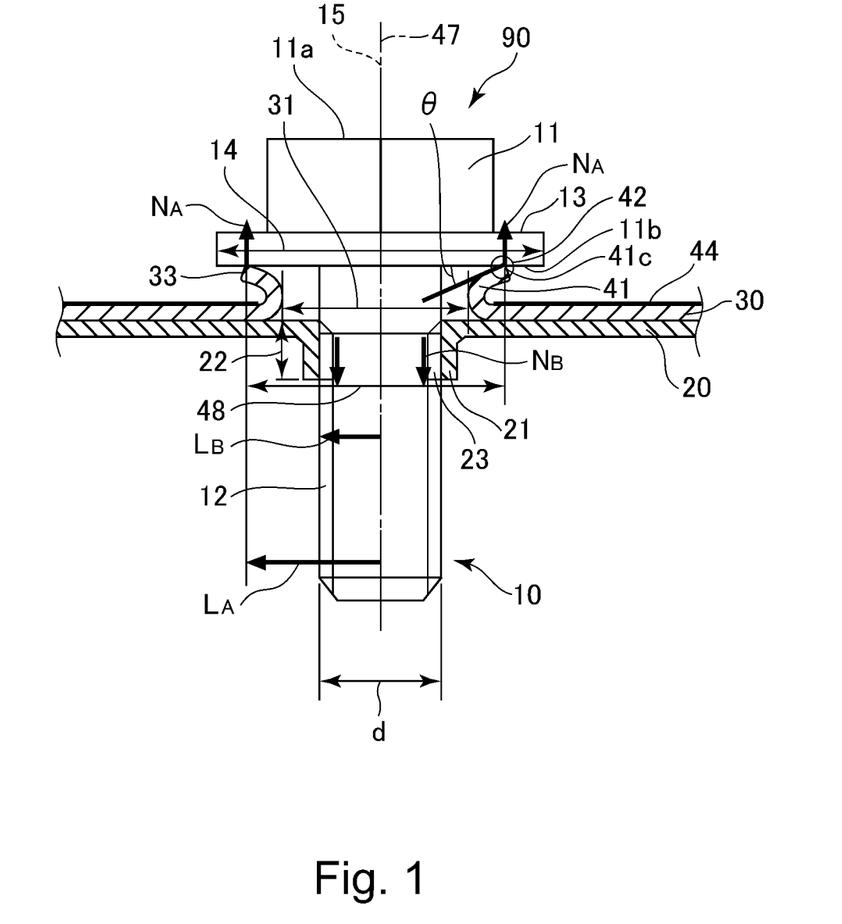
FIG. 1 is a schematic sectional view showing an example of a fastened structure according to Embodiment 1 of the present invention.

FIG. 1 is a schematic sectional view showing an embodiment of a fastened structure 90 according to the present invention.

A screw (male screw) 10 includes a screw head (head portion) 11 and a screw thread portion (male screw portion) 12. In this embodiment, the screw head 11 is formed integrally with a screw flange portion 13, having a large diameter, provided in a side toward the screw thread portion 12. The screw flange portion 13 constitutes a part of the screw head 11 and forms a bearing surface portion (bearing surface) 11b of the screw head 11. A cross-shaped hole (not shown) for rotating the screw 10 by a cross slot screw driver or the like is formed at a top portion 11a of the screw head 11 provided at an end of the screw thread portion 12 of the screw 10. At an outer peripheral surface of the screw thread portion 12, male screws as screw threads are formed. As described above, the screw flange portion 13 constituting the bearing surface portion 11b of the screw head 11 is disposed in the side toward the screw thread portion 12, and has a flange shape having a diameter, perpendicular to a longitudinal direction of the screw thread portion 12, larger than a diameter of the screw head 11. Further, the bearing surface portion 11b can also be a flat surface perpendicular to a screw rotational axis 15 and can also have a recessed shape inclined from the screw rotational axis 15 toward an outside with respect to a radial direction. This will be described specifically later.

A pitch, which is a distance between adjacent (two) screw threads of the male screw portion of the screw 10, is 0.5 mm with a nominal diameter d of 3 mm, which is a diameter of the male screw portion of the screw thread portion 12. Further, the pitch of the screw 10, when the nominal diameter d is 4 mm, is 0.75 mm. In the case where a fastening material 20, which is a thin steel plate, is fastened with the screw of 3 mm or 4 mm in nominal diameter d, a sufficient engaging length cannot be ensured between the screw thread portion 12 and the fastening material 20 by only a thickness of 1.2 mm, which is a plate thickness of the fastening material 20. For example, engagement, when the pitch of the screw 10 having the nominal diameter d of 3 mm is 0.5 mm and the plate thickness of the fastening material 20, is, e.g., 1.2 mm. As described above, this engagement is made in about two and $\frac{2}{5}$ turns, so that the engaging length cannot be ensured. Further, in the case where the screw 10 has the nominal diameter d of 4 mm, the pitch is 0.75 mm, and therefore engagement at the fastening portion is made by about one and $\frac{3}{5}$ turns, so that the engaging length cannot be further ensured. In the cases of these engaging lengths, a fastening force at the fastening portion is naturally weak. For this reason, there is a need to effect burring at a screw hole of the fastening material 20 corresponding to a thread engaging portion to be threadly engaged with the screw 10. By subjecting the fastening material 20 to the burring at the screw hole, the engaging length can be made longer than the original plate thickness. The fastening material 20 used in this embodiment is the thin steel plate of 1.2 mm or less in plate thickness and has a burring portion 21 obtained by subjecting the fastening material 20 to the burring.

On the other hand, a fastened material 30 includes a substantially circular folded-back portion (shape) 41 formed by folding back the fastened material 30, in the neighborhood of the rotational axis position of the screw 10, i.e., in a region corresponding to a hole (opening) 31, to have a inwardly curved convex projection shape (projection).The folded-back portion 41 is formed by folding back the fastened material 30 by an angle, toward the bearing surface of the screw flange portion 13, of 90 degrees or more and 180 degrees or less. A burring portion 21, defining the screw of the fastening material 20, which is a metal plate such as the thin steel plate and the hole 31 of the fastened material 30, are aligned (superposed) with each other. Then, by fastening the fastening material and the fastened material with the screw 10 under application of a fastening torque to the screw 10, the fastened structure 90 is provided by screw fastening. In the fastened structure 90, by applying the torque to the screw 10, the screw thread portion 12 formed on the screw 10 is engaged with a thread engaging portion (hereinafter referred to as a "female screw (portion)") 23 where a female screw shape is formed in advance inside the burring portion 21 of the fastening material 20. Then, the bearing surface portion 11b of the screw flange portion 13 of the screw 10 contacts an edge 41c at a free end of the folded-back portion 41 of the fastened material 30 at a contact portion 42, so that the edge 41c is pressed against or bites into the bearing surface portion 11b of the male screw 10, thus fastening the material 20 and the material 30.

That is, the folded-back portion includes a curved surface defining an opening 31 and includes the free end which has the edge 41c pressed against or biting into the bearing surface 11b of the male screw 10.

Figure 2:
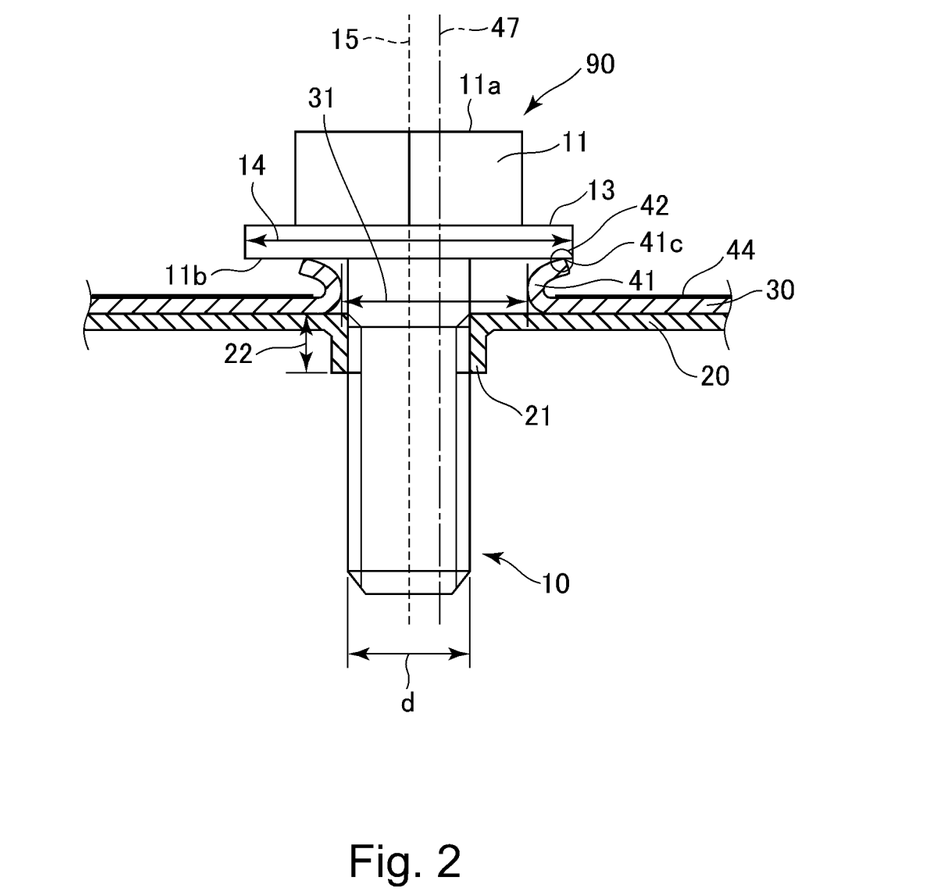
FIG. 2 is a schematic sectional view showing the fastened structure in Embodiment 1 when screw fastening is made at a position where a rotational axis of a screw is deviated from a rotational axis of a hole (opening).

Here, a diameter 48 of the hole 31 along which the folded-back portion 41 of the fastened material 30 is provided (hereinafter, this diameter 48 is referred to as a "folded-back portion diameter 48") is set at a value shorter than a direction 14 of the screw flange portion 13 extending in a direction perpendicular to the rotational axis 15 of the screw 10 (hereinafter, this diameter 14 is referred to as a "screw flange portion diameter 14"). This is because as shown in FIG. 2, even when the screw fastening is made at a position where a center of the rotational axis 15 of the screw 10 is deviated from a center axis 47 of the hole 31, the contact portion 42 is located inside an outer peripheral portion of the screw flange portion 13 with respect to a diameter direction. For that purpose, a maximum length of the folded-back portion diameter 48 is set so as to be shorter than an outer peripheral portion diameter, of the screw head 11, which is the screw flange portion diameter 14. For example, in the case where the fastened material 30 of 4.5 mm in diameter of the hole 31 is fastened with the screw 10 of 3 mm in nominal diameter d, the screw flange portion diameter 14 of the screw 10 of 3 mm in nominal diameter d is about 8 mm. In that case, the folded-back portion diameter 48 is set at a value of 6.4 mm or less including tolerance. By setting the folded-back portion diameter 48 at this value, even when the fastened material 30 is fastened with the screw 10 at any position of the hole 31, the contact portion 42 can be located inside the outer peripheral portion of the screw flange portion 13 with respect to the diameter direction of the screw flange portion 13, so that the contact portion 42 contacts the screw flange portion 13 with no problem.

Further, the contact portion 42 is located at a furthest position from the rotational axis 15 of the screw 10 in a region in which the screw flange portion 13 is contactable to the fastened material 30.

In this embodiment, the reason why the contact portion 42 is provided at the furthest position from the rotational axis 15 of the screw 10 will be described below.

Figure 3:
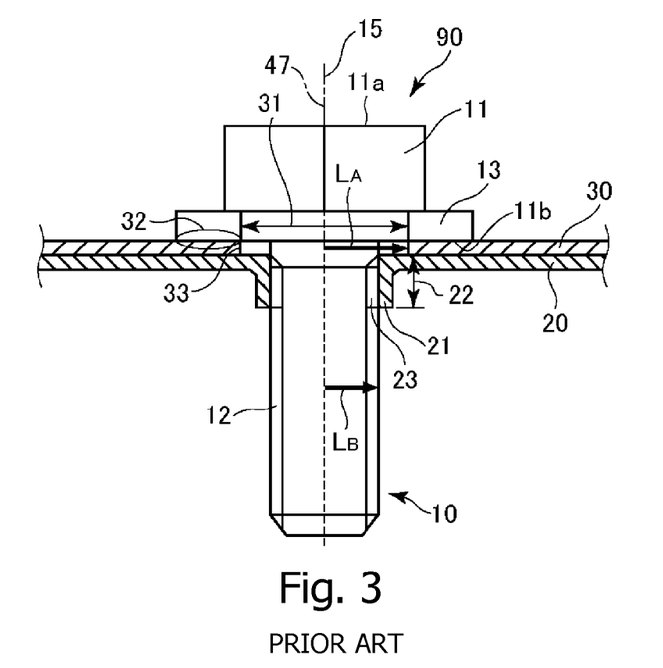
FIG. 3 is a schematic sectional view of a conventional fastened structure.

FIG. 3 shows an example of a convention fastened structure 90 in which a fastened material 30 is fastened to the fastening material 20 with a screw 10 in a conventional manner.

The screw 10 includes a screw head 11 and a screw thread portion 12. In this embodiment, the screw head 11 is formed integrally with a screw flange portion 13 provided in a side toward the screw thread portion 12 to form a bearing surface portion 11b of the screw head 11. A cross-shaped hole (not shown) for rotating the screw 10 by a cross slot screw driver or the like is formed at a top portion 11a of the screw head 11 provided at an end of the screw thread portion 12 of the screw 10. At an outer peripheral surface of the screw thread portion 12, male screws as screw threads are formed. The screw flange portion 13 has a flange shape having a diameter, perpendicular to a rotational axis of the screw thread portion 12, larger than a diameter of another portion of the screw head 11.

The fastening material 20 includes a burring portion 21 formed by drawing a part of the fastening material 20 by burring to have a burring height 22. The fastening material 20 is threadly engaged with the screw thread portion 12 at a female screw portion 23 which is a thread engaging portion where a female screw shape portion is formed in advance inside the burring portion 21. At the female screw portion 23 of the fastened structure 90 using the screw 10, a female screw shape is provided in advance, but in the case where the screw 10 is a tapping screw, there is no need to provide the female screw shape in advance.

In this example, the fastening material 20 is formed with a steel material having a plate thickness of 1.2 mm or less, and includes the burring portion 21 drawn to have the burring height 22 at a hole portion perforated through the steel material constituting the fastening material 20.

The fastened material 30 includes the hole 31 and contacts the screw thread portion 13 at a flange contacting portion 32 in the neighborhood of the hole 31. The burring portion 21 defining a screw hole of the fastening material 20 and the hole 31 of the fastened material 30 are aligned (superposed) with each other, and then the fastened material 30 is fastened to the fastening material 20 with the screw 10 under application of a fastening torque to the screw 10, so that the fastened structure 90 is provided by screw fastening.

Here, a relationship between a torque and a force when the fastening material 20 and the fastened material 30 are fastened with the screw 10 by rotating the screw 10 at a fastening torque $T_1$ will be described.

A bearing surface torque $T_2$ generated at the flange contacting portion 32 is represented by the following formula (1) which is the product of a friction coefficient $\mu_A$ between the screw flange portion 13 and the fastened material 30 at the flange contacting portion 32, normal reaction $N_A$, and a distance $L_A$ between the center of the rotational axis 15 of the screw 10 and the flange contacting portion 32.

$$T_2 = \mu_A \times N_A \times L_A \quad (1)$$

The friction coefficient $\mu_A$ is determined by a surface property of the fastened material 30, and is a constant value.

A screw portion torque $T_3$ generated at an engaging portion between the male screw portion 12 and the female screw portion 23 is represented by the following formula (2) which is the product of a friction coefficient $\mu_B$ between the screw thread portion 12 and the burring portion 21 at the female screw portion 23, an axial force $N_B$ exerted on the female screw portion 23, and a distance $L_B$ between the center of the rotational axis 15 of the screw 10 and the female screw portion 23.

$$T_3 = \mu_B \times N_B \times L_B \quad (2)$$

The friction coefficient $\mu_B$ is determined by surface properties of the screw thread portion 12 and the burring portion 21, and is a constant value.

Here, the normal reaction $N_A$ and the axial force $N_B$ are gradually increased by rotating the screw 10 under application of the fastening torque $T_1$ to fasten the fastening material 20 and the fastened material 30, and are balanced with each other when the following formula (3) is satisfied.

$$T_1 = T_2 + T_3 (N_A = N_B) \quad (3)$$

In this state, the screw 10 is not rotated further.

As described above, as shown in the formula (1), if the friction coefficient $\mu_A$ is equal to the normal reaction $N_A$, the bearing surface torque $T_2$ is proportional to the distance between the rotational axis center and the contact portion. Therefore, a value of the distance $L_A$ from the center of the rotational axis 15 to the contact portion 42 can be increased by providing the contact portion 42 at a position remotest from the rotational axis 15, so that it becomes possible to increase an anti-loosening resistance between the screw 10 and the fastened material 30 to enhance the bearing surface torque $T_2$.

Further, the screw flange portion 13 and the folded-back portion 41 contact at a contact angle θ. The contact angle θ is formed between the bearing surface portion 11b of the screw flange portion 13 and an opposing surface, of the fastened material 30, where the fastened material 30 having the edge 41c opposes the screw flange portion 13. In order to form the contact angle θ, the folded-back portion 41 is provided by bending (or folding back) the fastened material 30 at an angle of 90 degrees or less or at an angle of 90 degrees or more and 180 degrees or less in a region in the neighborhood of the position of the rotational axis 15 of the screw 10.

By forming the contact angle θ, even when the screw flange portion 13 is parallel to an upper surface 44 of the fastened material 30, the screw flange portion 13 can be contacted to the folded-back portion 41 at the contact portion 42, i.e., at the edge 41c of the folded-back portion 41, with reliability. As a result, it becomes possible to increase the bearing surface torque $T_2$.

Next, a measurement result of the axial force when the fastening material and the fastened material are fastened with the screw 10 in the fastened structure 90 in this embodiment will be described.

Figure 4:
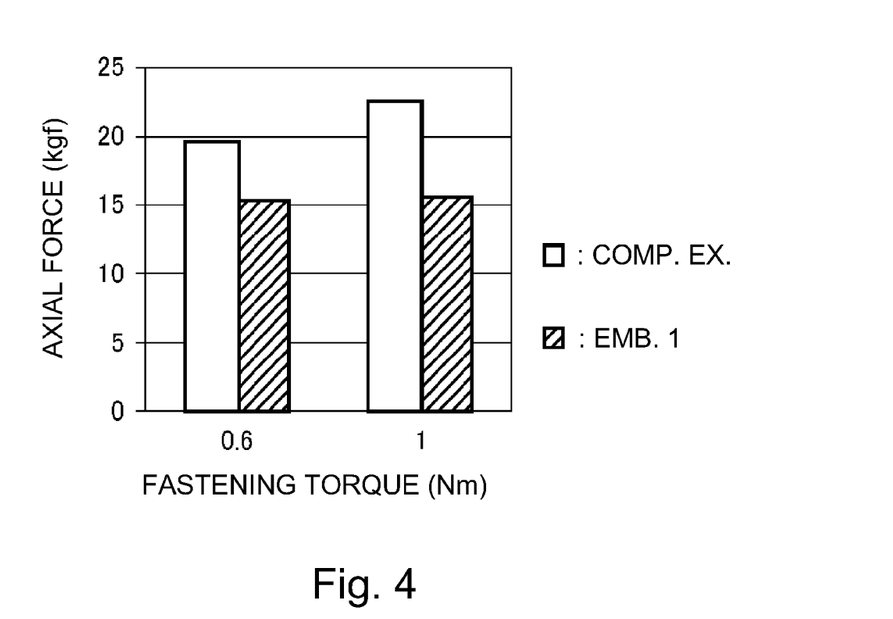
FIG. 4 is a graph for comparing effects on an axial force between the fastened structures in Embodiment 1 and a comparison example.

FIG. 4 shows a result of measurement of the axial force $N_B$ when the fastening material 20 and the fastened material 30 each of which is formed with a 0.4 mm-thick thin steel plate are fastened with the screw 10 having the nominal diameter d of 3 mm at a constant fastening torque $T_1$.

Here, the diameter of the hole 31 of the fastened material 30 was 4.5 mm, and the folded-back portion 41, having the folded-back portion diameter 48 of 6.2 mm was formed from an end portion of the hole 31 of the fastened material 30. Further, the burring portion 21 (burring height 22=1.4 mm) was formed on the fastening material 20. As a comparison example, a measurement result of the axial force $N_B$ in the case where the folded-back portion 41 is not formed on the fastened material 30 is also shown.

As is understood from a graph of FIG. 4, compared with the case where the folded-back portion 41 is not provided as the comparison example, the axial force $N_B$ is lowered in the case where the folded-back portion 41 is provided as in this embodiment (Embodiment 1).

That is, in this embodiment, it is understood that the screw portion torque $T_3$ is lowered and that the bearing surface torque $T_2$ is increased under a condition of the constant fastening torque $T_1$. In the case where the screw fastening is made, in order to satisfy $N_A = N_B$, when the friction coefficient between the screw 10 and the fastened material 30 in this embodiment is $\mu_A$, and the friction coefficient between the screw 10 and the fastened material 30 in the comparison example is $\mu_A'$, $\mu_A > \mu_A'$ is satisfied. Therefore, the fastened material 30 is positively contacted to the screw flange portion 13 at the edge 41c directed upward from the upper surface 44 in FIG. 1, so that it is understood that the frictional coefficient $\mu_A$, between the screw 10 and the fastened material 30 is increased and thus the frictional force is increased, and thus the bearing surface torque $T_2$ is increased.

Figure 5:
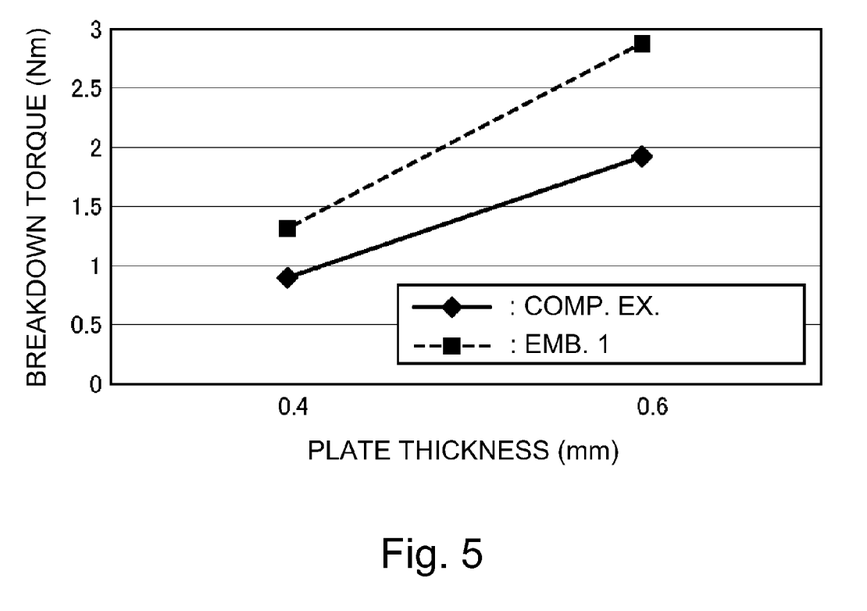
FIG. 5 is a graph for comparing effects on a breakdown torque between the fastened structures in Embodiment 1 and the comparison example.

Next, a breakdown torque of the screw 10 was measured in the case where the fastened material 30 including the folded-back portion 41 was used as in this embodiment and in the case where the fastened material 30 which does not include the folded-back portion 41 was used as in the comparison example.

FIG. 5 shows a measurement result of the breakdown torque when the fastening material 20 and the fastened material 30 each of which is formed with a 0.4 mm-thick thin steel plate are fastened with the screw 10 having the nominal diameter d of 3 mm.

Here, the diameter of the hole 31 of the fastened material 30 was 4.5 mm, and the folded-back portion 41, having the folded-back portion diameter 48 of 6.2 mm was formed from an end portion of the hole 31 of the fastened material 30. Further, the burring portion 21 (burring height 22=1.4 mm) was formed on the fastening material 20. As a comparison example, a measurement result of the breakdown torque in the case where the folded-back portion 41 is not formed on the fastened material 30 is also shown in FIG. 5. According to the measurement result of the breakdown torque of the fastened structure 90 in which the screw hole of the fastening material 20 and the hole of the fastened material 30 are aligned (superposed) with each other, and then the fastening material 20 and the fastened material 30 are fastened with the screw 10 under application of the fastening torque to the screw 10, as an effect of the screw fastening under application of the fastening torque to the screw 10, the breakdown torque is improved in performance by 45% as an average.

Incidentally, as shown in FIG. 5, in the case where each of the plate thicknesses of the fastening material 20 and the fastened material 30 is 0.6 mm, when the folded-back portion 41 is formed on the fastened material 30, compared with the case where there is no folded-back portion 41, it is understood that the breakdown torque is improved by 50% as an average.

Figure 6:
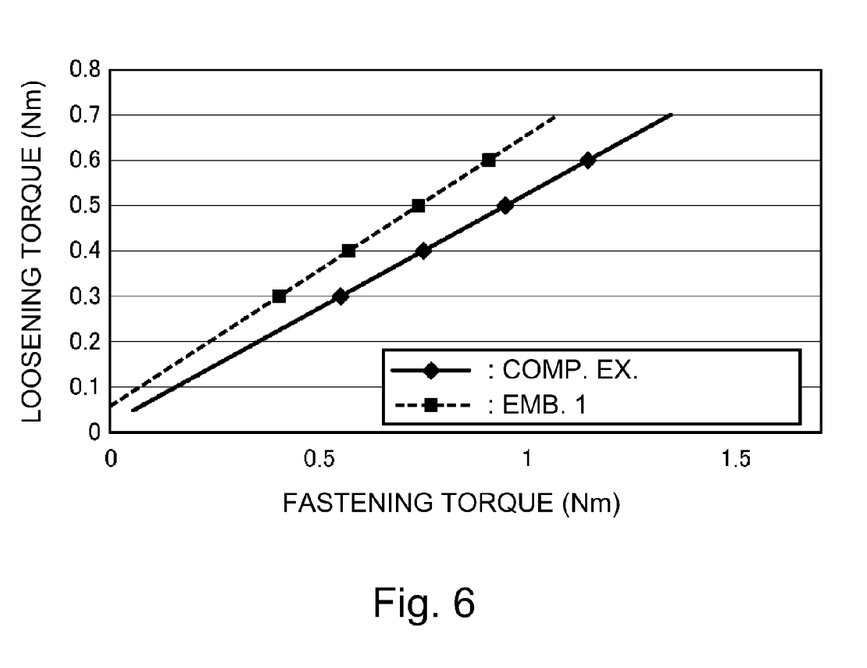
FIG. 6 is a graph for comparing effects on a loosening torque between the fastened structures in Embodiment 1 and the comparison example.

Next, a measurement result of a loosening torque during the screw fastening in the fastened structure in this embodiment and in the fastened structure including no folded-back portion 41 in the comparison example will be described.

FIG. 6 shows a result of measurement of the loosening torque when the fastening material 20 and the fastened material 30 each of which is formed with a 0.4 mm-thick thin steel plate are fastened with the screw 10 having the nominal diameter d of 3 mm at the fastening torque of 0.6 Nm. The diameter of the hole 31 of the fastened material 30 was 4.5 mm. The burring portion 21 was formed in the fastening material 20, and the folded-back portion 41, having the folded-back portion diameter 48 of 6.2 mm was formed on the fastened material 30. As a comparison example, a measurement result of the loosening torque in the case where the folded-back portion 41 is not formed on the fastened material 30 is also shown in FIG. 6. As an effect of the folded-back portion 41 of the fastened material 30, it is understood that the loosening torque is improved by 26% to 36% as an average.

As is understood from the above results, in the case where the folded-back portion 41 is formed on the fastened material 30 as in this embodiment, compared with the case where the folded-back portion 41 is not formed on the fastened material 30, it would be considered that the breakdown torque is improved, and in addition, also an effect of preventing loosening of the torque is obtained.

Figure 7:
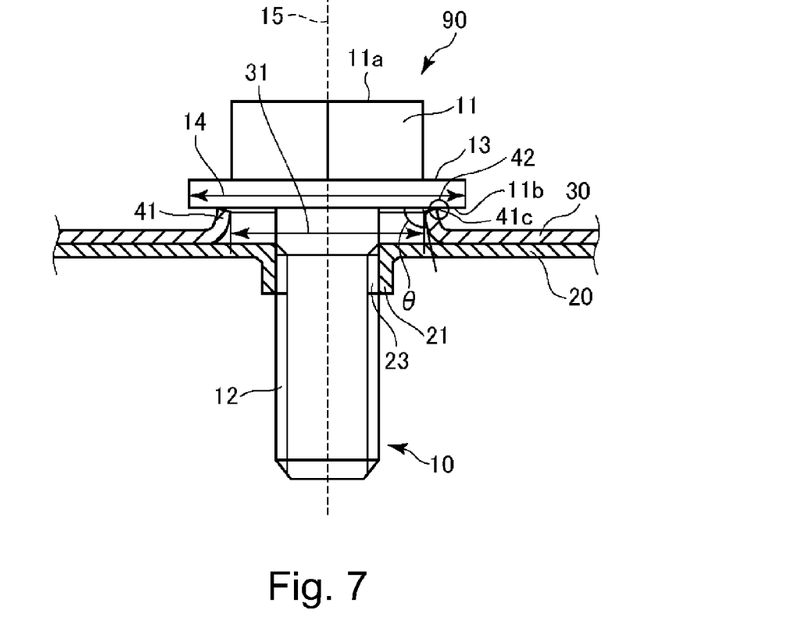
FIGS. 7 and 8 are schematic sectional views each showing a fastened structure in another embodiment of the present invention.
Figure 8:
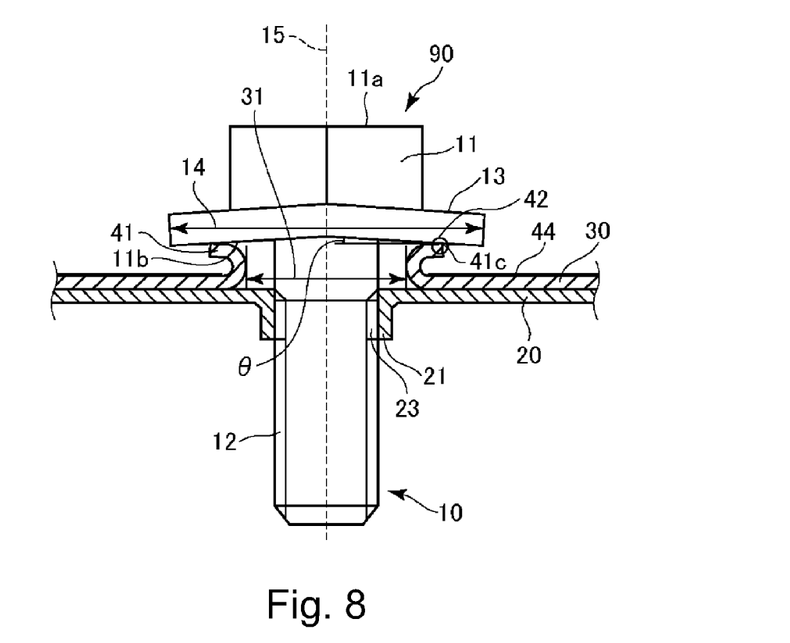

Incidentally, the shape of the folded portion 41 of the fastened material 30 may only be required that the screw flange portion 13 (i.e., the bearing surface portion 11b) contacts the edge 41c at the contact portion 42, and may also be a folded shape, as shown in a fastened structure 90 in FIG. 7, such that the contact angle θ is 90 degrees or more. That is, the fastened material 30 may also be folded toward the screw head bearing surface portion 11b by the angle of 90 degrees or less in the region in the neighborhood of the position of the screw rotational axis 15. Further, as shown in a fastened structure 90 in FIG. 8, also the case where the fastened material 30 is folded back from the end portion of the hole 31 so that a folded-back end portion is substantially parallel to the upper surface 44 thereof is similarly applicable. That is, even in a folded-back shape such that the fastened material 30 is folded back toward the screw head bearing surface portion 11b by 180 degrees in the region in the neighborhood of the position of the rotational axis 15, the contact angle θ may only be required to be provided by using a screw 10 including a tapered screw flange portion 13 having a recessed (bent) shape such that the screw flange portion 13 is inclined from the rotational axis 15 toward an outside thereof with respect to a radial direction. In either case, the screw flange portion 13 positively contacts the edge 41c of the folded or folded-back portion 41, so that the edge 41c is pressed against or bites into the bearing surface portion 11b of the male screw 10, and the contact portion 42 is located at a position remotest from the rotational axis 15, so that a similar effect can be obtained.

Incidentally, at the female screw portion 23, a female screw shape is formed in advance, but in the case where the screw 10 is the tapping screw, there is no need to form the female screw shape.

As described above, according to the present invention, as a means for improving the fastening torque, the part of the fastened material 30 is used, and therefore in a state in which electrical connection between the fastening material 20 and the fastened material 30 is stabilized, it is possible to ensure a sufficient fastening force by using the thin steep plate of 0.4 mm to 0.6 mm in thickness or other thin metal plates.

Accordingly, in uses in which the screw fastening is employed at the fastening portion, the fastened structure of the present invention is suitably used.

For example, in an electrical unit, in which an electric substrate is mounted, used in, e.g., a printer or a copying machine, in view of a part exchange (replacement) property in the market, it is desired that demounting of the parts is easy, and therefore the screw fastening is employed. At the same time, there is need to establish the electrical connection between the fastening material 20 and the fastened material 30 via the contact portion 42 between the fastened material 30 and the screw head 11 and the contact of the screw thread portion 12 with the fastening material 20.

Further, in view of an assembling property in a manufacturing factory and exchangeability (replacement property) in the market, weight reduction is desired, so that it is desirable that a metal plate constituting the electrical unit is thin.

Here, in the case where the metal plate used in the electrical unit is the thin steel plate, there is a need to ensure a sufficient fastening force in the screw fastening, but in the above-described conventional means, the elastic member is sandwiched between the screw 10 and the fastened material 30, and therefore the electric connection becomes unstable.

On the other hand, according to the present invention, as the fastening torque improving means, the part of the fastened material 30 is used, and therefore in the state in which the electrical connection between the fastening material 20 and the fastened material is stabilized, it becomes possible to ensure the sufficient fastening force by using the thin steel plate.

According to the present invention, it is possible to provide the fastened structure, for the thin metal plate, capable of fastening the fastening material and the fastened material at a predetermined fastening torque, without increasing the number of parts while maintaining operation productivity during the screw fastening, even in the case of the fastening portion where the stable electrical connection between the fastening material and the fastened material is required.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 146867/2012 filed Jun. 29, 2012, which is hereby incorporated by reference.

What is claimed is:

1. A fastened structure comprising:
   a first member provided with a female screw portion;
   a second member provided with an opening;
   a male screw fastening said first member and said second member with each other and including a male screw portion, and a head portion having a bearing surface, wherein the male screw portion is threaded in the female screw portion of said first member through the opening of said second member; and
   a substantially circular folded portion formed by folding back the second member in the direction toward the bearing surface and including a curved surface defining the opening and a free end having a first edge that is formed on a first surface of said second member, said first edge biting into the bearing surface of said male screw, and a second edge that is formed on a second surface of said second member opposite from the first surface, said second edge not biting into the bearing surface of said male screw,
   wherein the free end is folded back toward an outside of said male screw portion with respect to a radial direction so that a contact angle formed between said first surface and the bearing surface is an acute angle.

2. A fastened structure according to claim 1, wherein the curved surface is formed by folding said second member, in a direction toward the bearing surface of the head portion, in a region in the neighborhood of a rotational axis of said male screw.

3. A fastened structure according to claim 2, wherein the bearing surface of the head portion is a flat surface perpendicular to the rotational axis of said male screw or has a recessed shape inclined from the rotational axis toward an outside with respect to the radial direction.

4. A fastened structure according to claim 1, wherein a distance from a center of a rotational axis of said male screw to the first edge of said second member contacting the bearing surface of the head portion is greater than a distance from the center of the rotational axis of said male screw to an outer peripheral portion of said male screw portion and is less than a diameter of an outer peripheral portion of the head portion.

5. A fastened structure according to claim 1, wherein said second member is formed with a metal plate of a thickness which is 1.2 mm or less and more than 0 mm.

6. A fastened structure according to claim 1, wherein the bearing surface has an inclined surface inclined so that the bearing surface is positioned on a free end side toward the outside of said male screw portion with respect to the radial direction, and
   wherein the free end is configured to be in contact with the inclined surface, and the bearing surface is configured to not be in contact with any portion of said second member except for the free end.

7. A fastened structure according to claim 1, wherein the head portion includes a screw flange portion projecting toward the toward the outside of said male screw portion with respect to the radial direction, and
wherein the free end is configured to be in contact with the screw flange portion.

* * * * *